United States Patent
Aila et al.

(10) Patent No.: US 8,502,819 B1
(45) Date of Patent: *Aug. 6, 2013

(54) SYSTEM AND METHOD FOR PERFORMING RAY TRACING NODE TRAVERSAL IN IMAGE RENDERING

(75) Inventors: Timo Aila, Helsinki (FI); Samuli Laine, Helsinki (FI); John Erik Lindholm, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 646 days.

This patent is subject to a terminal disclaimer.

(21) Appl. No.: 12/780,965

(22) Filed: May 17, 2010

Related U.S. Application Data

(63) Continuation-in-part of application No. 11/958,240, filed on Dec. 17, 2007, now Pat. No. 8,289,324.

(51) Int. Cl.
  *G06T 15/50* (2011.01)
  *G06T 15/00* (2011.01)
  *G06T 17/00* (2006.01)

(52) U.S. Cl.
  USPC ............................ 345/426; 345/419; 345/420

(58) Field of Classification Search
  None
  See application file for complete search history.

(56) References Cited

U.S. PATENT DOCUMENTS

| | | | |
|---|---|---|---|
| 5,666,298 A | 9/1997 | Peleg et al. | |
| 5,675,825 A | 10/1997 | Dreyer et al. | |
| 5,802,336 A | 9/1998 | Peleg et al. | |
| 5,933,146 A | 8/1999 | Wrigley | |
| 6,041,404 A | 3/2000 | Roussel et al. | |
| 6,243,803 B1 | 6/2001 | Abdallah et al. | |
| 6,247,116 B1 | 6/2001 | Abdallah et al. | |
| 6,418,529 B1 | 7/2002 | Roussel | |
| 6,651,151 B2 | 11/2003 | Palanca et al. | |
| 6,671,795 B1 | 12/2003 | Marr et al. | |
| 6,868,420 B2 | 3/2005 | Perry et al. | |
| 7,999,808 B1 | 8/2011 | Aila et al. | |
| 8,059,123 B1 | 11/2011 | Laine et al. | |
| 8,065,288 B1 | 11/2011 | Garland et al. | |
| 8,289,324 B1 | 10/2012 | Laine et al. | |
| 2008/0024489 A1* | 1/2008 | Shearer | 345/421 |
| 2009/0089542 A1 | 4/2009 | Laine et al. | |
| 2009/0106530 A1 | 4/2009 | Lauterbach et al. | |
| 2009/0132878 A1 | 5/2009 | Garland et al. | |
| 2010/0079451 A1* | 4/2010 | Zhou et al. | 345/420 |

OTHER PUBLICATIONS

Hughes, D.M.; Ik Soo Lim; , "Kd-Jump: a Path-Preserving Stackless Traversal for Faster Isosurface Raytracing on GPUs," Visualization and Computer Graphics, IEEE Transactions on , vol. 15, No. 6, pp. 1555-1562, Nov.-Dec. 2009.*
Notice of Allowance from U.S. Appl. No. 11/958,240, dated Sep. 6, 2012.

(Continued)

*Primary Examiner* — Kee M Tung
*Assistant Examiner* — Zhengxi Liu
(74) *Attorney, Agent, or Firm* — Zilka-Kotab, PC

(57) ABSTRACT

A method for performing a ray tracing node traversal operation in an image rendering process includes traversing a plurality of nodes within spatial hierarchy that represents a scene which is to be rendered, the spatial hierarchy including two or more hierarchy levels, each hierarchy level including one or more nodes. A number representing the number of nodes traversed in each one of a plurality of different hierarchy levels is stored, wherein each number is represented by at least one bit in a multi-bit binary sequence.

24 Claims, 3 Drawing Sheets

OTHER PUBLICATIONS

Aila, T. et al., U.S. Appl. No. 12/780,963, filed May 17, 2010.
Aila, T. et al., U.S. Appl. No. 12/780,964, filed May 17, 2010.
Non-Final Office Action from U.S. Appl. No. 11/958,240, dated Jan. 14, 2011.
Final Office Action from U.S. Appl. No. 11/958,240, dated Jun. 9, 2011.
Advisory Action from U.S. Appl. No. 11/958,240, dated Aug. 30, 2011.

* cited by examiner

SYSTEM AND METHOD FOR PERFORMING RAY TRACING NODE TRAVERSAL IN IMAGE RENDERING

CROSS REFERENCE TO RELATED APPLICATIONS

This application claims the benefit of priority of U.S. application Ser. No. 11/958,240, entitled "System, Method, and Computer Program Product for Spatial Hierarchy Traversal," filed Dec. 17, 2007, the contents of which is herein incorporated by reference for all purposes.

This application further incorporates by reference in its entirety each of the following commonly-owned, concurrently filed US non-provisional patent applications:

US Non-provisional patent application entitled "System and Method for Performing Predicated Selection of an Output Register," Ser. No. 12/780,963; and US Non-provisional patent application entitled "System and Method for Accelerated Ray-Box Intersection Testing," Ser. No. 12/780,964.

BACKGROUND

Ray tracing refers to a family of techniques for determining point to point visibility in a geometric scene, typically for the purpose of synthesizing an image. For example, an image of a virtual scene may be rendered by conceptually locating a virtual eyepoint and a virtual computer screen in the scene, then creating rays, called primary rays, from the eyepoint through every pixel of the screen. By computing the intersection of the primary rays with every object in the scene (e.g. tracing the rays), and selecting the first object intersected by every ray, the visible object at each pixel and color of the pixel may be determined accordingly.

Computing this color, a process called shading, may involve tracing additional rays called secondary rays. For example, shading may be utilized to determine the color of objects reflected in shiny objects (e.g., reflection rays) or to determine whether a point is in shadow by computing the visibility between a light source and a point being shaded (shadow rays). Shadow rays are a special case, since they only need to determine whether a ray segment intersects any object, and not which of multiple possible intersecting objects the ray intersects first.

In practice, ray tracing systems and techniques do not intersect every ray with every object in the scene. Instead, objects are organized into spatial data structure, occasionally a grid, but most often a tree such as a bounding volume hierarchy (BVH) or k-dimensional (k-d) tree. Each ray is then traversed through the tree by determining which tree nodes the ray intersects. Only objects contained by intersected nodes need to be tested for intersection with the ray.

Traversing a ray through a tree data structure, such as a BVH or k-d tree, involves recursively visiting one child of a node, then, if the ray does not hit anything in that child, visiting another child. Efficient implementations usually keep an explicit stack of "children to be visited" in an iterative loop rather than use a recursive formulation. Either case presents a potential problem for implementation on parallel processing architectures, such as graphics processing units (GPUs). In parallel processing architectures, each thread tracing a ray may keep a stack of variable and potentially unlimited size. Since modern GPUs process thousands of threads at once, this possibility incurs significant storage and bandwidth costs.

One prior art implementation, called k-d restart, suggested a stackless traversal algorithm for k-d trees. This approach avoids the need to keep a stack by continuously restarting traversal from the root. When a ray is intersected with primitive(s) in a leaf node, the ray either hits a primitive, in which case traversal is terminated, or it fails to hit any primitive, in which case the ray origin is advanced to the point where it exits the node, and traversal begins anew at the top of the tree for the new, shortened ray. Clearly, k-d restarts require much more work and higher memory bandwidth than straightforward k-d tree traversal, since nodes near the top of the tree will be fetched many times for a single ray.

Another prior art implementation realized that k-d tree traversal could be made "stackless" by using a "short stack." A short stack has stack semantics (e.g. pop, push) but only keeps a small constant number k of entries. If more than k nodes are pushed on the stack, the oldest ones are simply discarded. An attempt to pop that would normally return a node which has been discarded initiates a k-d restart (advancing the ray origin and restarting the traversal at the root node).

Unlike k-d trees nodes, nodes of some other spatial hierarchies (e.g., BVHs) may overlap, so there is no way to advance the ray until it exits this node without potentially advancing past some primitives in another node that the ray should have intersected. Without BVH restart, stackless or short stack BVH traversal is not possible, forcing a full stack per thread, where a full stack per thread requires one 32-bit pointer per level. The latency and bandwidth consumption from storing or spilling the stack into slow and/or off-chip memory destroys performance and makes BVH traversal uncompetitive on a parallel processing architecture such as a GPU.

There is thus a need for addressing these and/or other issues associated with the prior art.

SUMMARY

A method for performing a ray tracing node traversal operation in an image rendering process includes traversing a plurality of nodes within spatial hierarchy that represents a scene which is to be rendered, the spatial hierarchy including two or more hierarchy levels, each hierarchy level including one or more nodes. A number representing the number of nodes traversed in each one of a plurality of different hierarchy levels is stored, wherein each number is represented by at least one bit in a multi-bit binary sequence.

These and other aspects and features of the invention will be better understood in view of the following drawings and detailed description of exemplary embodiments.

For clarity, previously-described features retain their reference indices in subsequent drawings.

DETAILED DESCRIPTION OF EXEMPLARY EMBODIMENTS

The concept of a "bit trail" and its use in ray tracing is described in pending U.S. application Ser. No. 11/958,240. In particular, the bit trail is a binary sequence that represents a record as to which of the hierarchy node(s) have been traversed. If the traversal needs to be restarted, the bit trail can be used to determine the most efficient entry point of the hierarchical structure, e.g., a node subsequent to the most recently traversed node (or "last visited node," as referred to herein).

Figure 1:
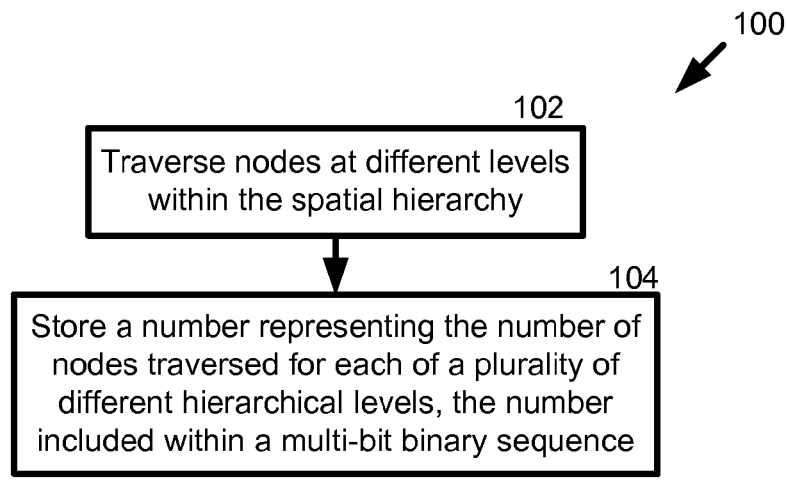
FIG. 1 illustrates a method for performing a ray tracing node traversal operation in an image rendering process in accordance with one embodiment of the present invention.

FIG. 1 illustrates a method for traversing a spatial hierarchy utilizing a bit trail multi-bit binary sequence in accordance with one embodiment of the present invention. Exemplary, the spatial hierarchy represents a collection of geometric primitives (e.g., triangles, polygons, spheres, boxes, etc.) which are to be rendered on a display device. The spatial hierarchy may take the form of a data structure, and in such a case the traversal operations of the spatial hierarchy are carried out by progressing through the data structure with a ray or a group of rays to determine whether one or more primitives of the spatial hierarchy intersect that ray or rays. The method may be practiced as a part of a larger ray-tracing image rendering process, in which the present method is employed as the node traversal operation of that process, and a primitive intersection operation is performed for each primitive a ray is determined as intersecting. In a particular embodiment, the primitive intersection operation may be carried out using a ray-box intersection test, as described in the Applicant's commonly-owned, copending US non-provisional application "System and Method for Accelerated Ray-Box Intersection Testing in Image Rendering," Ser. No. 12/780,964, herein incorporated by reference in its entirety. At the conclusion of the node traversal and primitive intersection operations, a scene of the intersected geometric primitives can be drawn or rendered using techniques known to the skilled person in computer graphics and rendering.

Referring to method 100, a plurality of nodes of a spatial hierarchy are traversed (i.e., the nodes are visited and tested for intersection with a ray) at 102, the spatial hierarchy representing a scene which is to be ray traced. The spatial hierarchy includes a plurality of levels, each level including one or more nodes. At 104 a number is stored, the number representing the number of nodes which have been traversed in each one of a plurality of different levels of the spatial hierarchy is stored. Each number is represented as (e.g., formatted as) one or more binary bits, and collectively the bits form a multi-bit binary sequence, or "bit trail," as described herein. The bit trail indicates the number of nodes visited at different levels of the spatial hierarchy, and thus the bit trail can be used to determine the last node visited or traversed, from which a subsequently occurring traversal operation can be continued. Analogously, the bit trail can also be used to determine how many nodes of the spatial hierarchy can be skipped upon a restart of the traversal process.

In a particular embodiment, one or more bits are used to indicate the number of nodes traversed at each level of the spatial hierarchy. For example, when a hierarchy level includes only two child nodes, a single bit may be used. In another embodiment, multiple bits (e.g., 2, 3, 4, 6, 8, or more bits) may be used to indicate the number of child nodes (correspondingly, $2^2$, $2^3$, $2^4$, $2^6$, $2^8$ child nodes) previously traversed/visited when the number of child nodes per level is greater than two. In still a further embodiment, at least one level of the spatial hierarchy omits a bit representation, i.e., the level is not represented by any binary digits. Such an arrangement can be advantageous to provide a deeper bit trail, for example, when the original (non-shortened) ray does not intersect both child nodes. An example of this condition is further described below.

As described, the bit trail is a binary sequence composed of multiple sections, each section composed of a single bit or multiple bits, with each section representing the number of previously traversed nodes for one level of the spatial hierarchy. Exemplary, the bit trail will comprise a concatenation of two numbers representing two hierarchy levels, or more specifically, two numbers which represent the number of traversed nodes in a corresponding two (exemplary, adjacent) hierarchy levels. Further exemplary, the number of bits in the bit trail binary sequence will be at least one bit per each parent node. In this context, a parent node is defined as a node which has at least one child node; a leaf node (which does not branch to a lower-order node) would not be considered a parent node in this context.

Further exemplary of operation 104, a first number is stored for a hierarchy level, and subsequently the first number is updated to a second number after traversal of a node included within said hierarchy level. For example, a first number may be a reset value (e.g., binary 0) which is initially stored for the hierarchy level, and once a node within the hierarchy level is traversed, the number may be updated to a binary value 1. Alternatively, a first number, e.g., binary digits 01, may be stored for the hierarchy level when a first child node has been traversed, and the first value updated to a second value of, e.g., binary digits 10, when a second of the nodes on the hierarchical structure is traversed. Exemplary, the updating operation may comprise a binary addition operation in which the binary value of the previous node is added to the binary value of the presently traversed node to arrive at an updated binary value/number for the hierarchy level, whereby a 1 is carried to the next, more significant bit when the sum exceeds the maximum allocated bit value.

Figure 2:
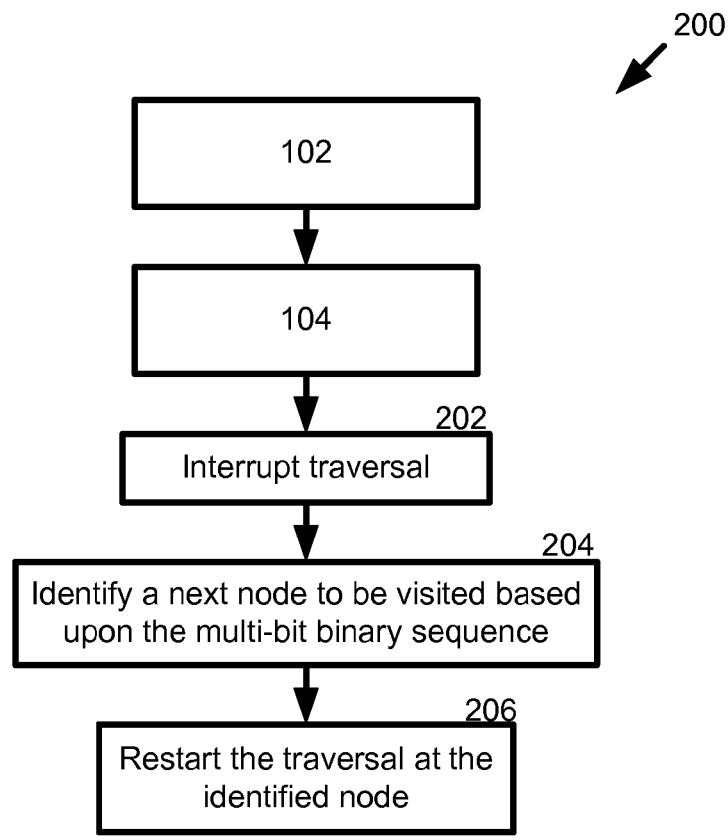
FIG. 2 illustrates a detailed implementation of the method in FIG. 1 in accordance with the present invention.

FIG. 2 illustrates a detailed implementation of the method in FIG. 1 in accordance with the present invention, with previously-described operations retaining the reference indices. As above, the method may be performed as a part of a larger ray-tracing image rendering process, in which the present method is employed as the node traversal operation of that process, and a primitive intersection operation is performed for each primitive a ray is determined as intersecting.

In this method 200, operations 102 and 104 are as described above, and at 202 the node traversal operation is interrupted. Interruption of the traversal operation may occur, when e.g., a stack of insufficient depth is used to store node information during traversal operations. If the spatial hierarchy includes more nodes than the stack can accommodate, traversal of the hierarchy may need to be suspended after the stack is exhausted, and the traversal continued after the next node to be visited has been determined.

At 204, a node of the spatial hierarchy which is to be visited/traversed during restart of the traversal operation is identified based upon the binary value of the bit trail. At 206, traversal of the spatial hierarchy is resumed at the node which is determined in operation 204 to be the next visited node.

Exemplary, the "next visited node" is the node subsequent to the most recently visited node. In such an embodiment, the next visited node may be identified by determining the binary value of the bit trail, and therefrom, determining the number of nodes (beginning from the root node) that can be skipped upon restart of the traversal operation, thereby arriving at the node subsequent to the most recently visited node. Alternatively, the next visited node may be ascertained by consulting a precomputed look-up table that maps from bit trail contents to nodes.

In a particular implementation, the bit trail is a data structure operable to direct the traversal to the next untraversed node (where "next" is determined by the traversal order chosen, as noted above) whenever a traversal is restarted. In this case, the bit trail may be viewed as any data structure that is managed during the traversal so that, upon restart of a traversal process, the data structure enables the traversal to avoid entering the branches of the hierarchy that have already been completely traversed, causing the traversal to ultimately continue at the next untraversed node. In this case, the data structure may indicate the number of nodes traversed and may be utilized to determine the next node which is to be traversed.

Figure 3:
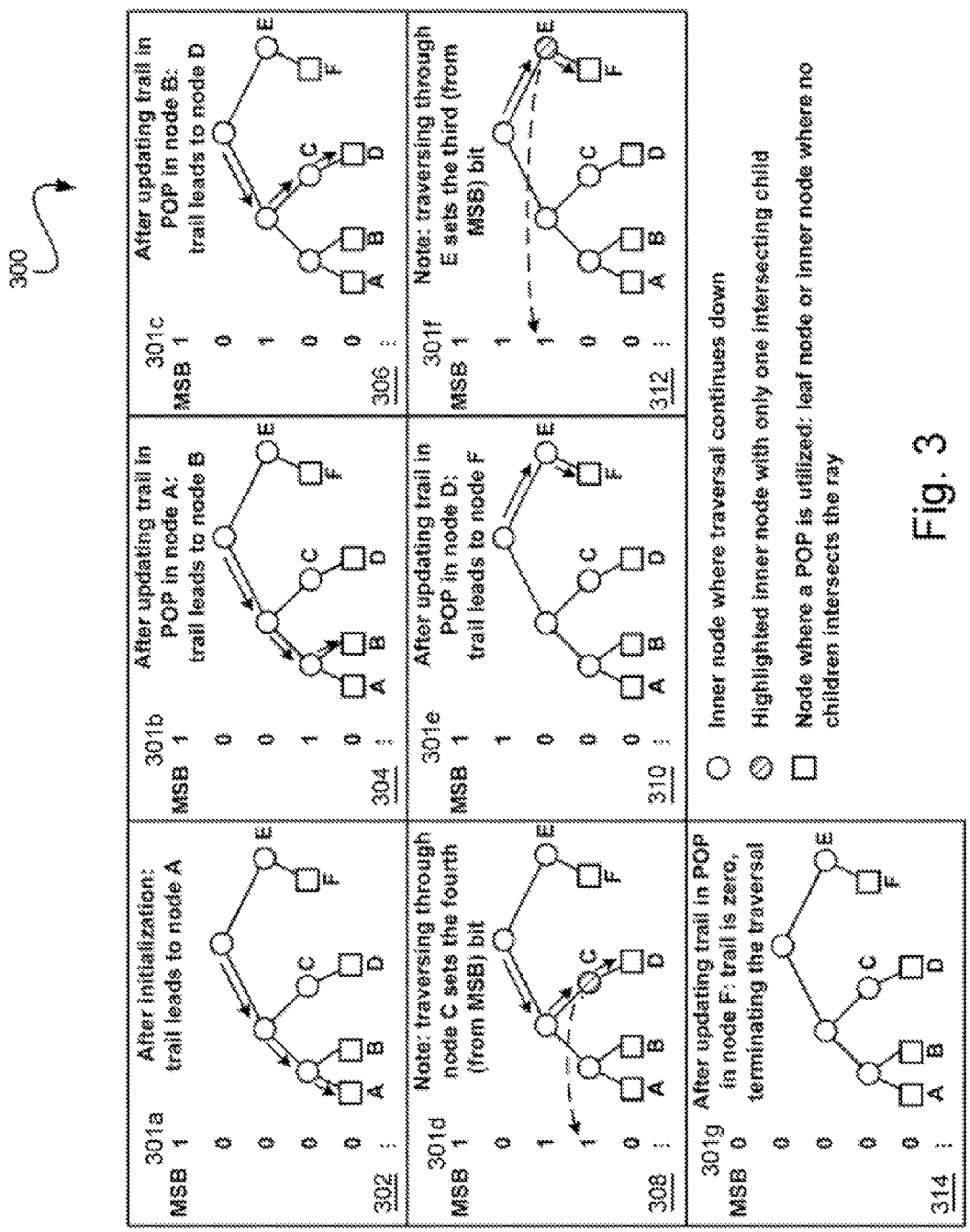
FIG. 3 illustrates a transversal technique in accordance with one embodiment of the present invention.

FIG. 3 illustrates a traversal technique 300 in accordance with one embodiment of the present invention. The technique illustrates how the bit trail leads to the node subsequent to the most recently visited node in accordance with the operations of FIG. 2.

After initialization, the bit trail binary sequence 301a leads to a first node A (operation 302). After an updating operation (e.g. using the POP subroutine in the incorporated parent application Ser. No. 11/958,240), the updated bit trail binary sequence 301b leads to a second node B as the next visited node (operation 304). After an updating operation, the updated bit trail binary sequence 301c leads to a third node D (operation 306). In this case, traversing through node C to node D sets the fourth bit in the updated bit trail 301d (operation 308). After the updating operation, the bit trail 301e leads to a fourth node F (operation 310). In this case, traversing through node E to node F sets the third bit in the updated bit trail 301f (operation 312). After updating the bit trail binary sequence to all zeros 301g, the traversal is terminated (operation 314).

In an exemplary embodiment, the bit trail may be implemented as a 64 bit struct:

```
// Acceleration tree traversal pointer
typedef struct {
    u06 ptr;            // [63:58]
    u58 path;           // [57:00]
} t_trail;
``` where ptr is the trail pointer (position in path), and path (i.e., the bit trail) consists of up to exemplary 58 binary digits that uniquely define the location of the current node in the spatial hierarchy.

In the following pseudocodes the non-standard notation (a, b, c)=func ( . . . ) denotes that function func sets/returns multiple variables a, b and c. An exemplary BIT_TRAIL instruction used in the methods of FIGS. 1 and 2 may be used as follows:

```
// Ray tracing main loop using BIT_TRAIL instruction
bool terminated = false;        // thread global, during initialization
bool revisit = false;           // thread global, during initialization
t_trail trail;                  // thread global
while(!terminated)
{
    bool intersect0, bool intersect1, bool simplified;
    if(!currentNode.containsPrimitives)
    {
        // node traversal
        (intersect0, intersect1, simplified) =
            computeNodeIntersections(ray, currentNode.childNodes);
    }
    else
    {
        // primitive intersection (may shorten the ray)
        (ray) = computePriIntersections(ray, currentNode.primitives);
        (intersect0, intersect1, simplified) = (false,false,false);
    }
    // manage traversal stack, determine which node to process next
    (currentNode, bool restart) =
        manipulateTravStack(childNodes, intersect0, intersect1, revisit);
    (trail, revisit, terminated) =
        BIT_TRAIL(trail,restart,intersect0,intersect1, simplified);
}
```

In the above pseudocode, manipulateTravStack ( . . . ) contains a short stack implementation including conditional push/pop based on child node intersections and a revisit flag. The function also determines if the short stack has exhausted, i.e., whether to restart the traversal from the root node or some other defined entry point of the tree. The revisit flag indicates whether the closer child node has been previously processed. In the illustrated implementation, the revisit flag is set when the closest child node has been processed, and accordingly the traversal decision is modified so that traversal proceeds to the farther child node instead of the closer one.

The BIT_TRAIL instruction updates the trail according to child node intersections and the restart flag. The simplified flag indicates an optional optimization that allows the BIT_TRAIL instruction to omit binary digits from the trail when the original (non-shortened) ray does not intersect both child nodes. By employing this optimization, it's possible to support trees that are deeper than the exemplary 58 levels, based upon the unlikelihood that a ray intersects both child nodes at every level.

Pseudocode of the above employed BIT_TRAIL instruction is as follows:

```
// BIT_TRAIL
(t_trail trail, bool revisit, bool terminate) = BIT_TRAIL(t_trail trail, bool
restart, bool intersect0, bool intersect1, bool simplified)
{
    bool overflow = false;
    if(intersect0 && intersect1)
    {
        trail.ptr--;
        if (ptr<0)
        {
            overflow = true;
            ptr = 0;
        }
    }
    else if(intersect0 || intersect1)
    {
        if (!simplified) // optimization that saves trail slots
        {
            trail.ptr--;
            if (ptr<0)
            {
                overflow = true;
                ptr = 0;
            }
            trail.path |= (1<<trail.ptr);
        }
    }
    else
    {
        trail.path &= -(1<<trail.ptr);    // clear bits lower than trail.ptr
        trail.path += (1<<trail.ptr);
        // find lowest one
        if(restart)                        trail.ptr = 57;
        else                               trail.ptr = findLowestOne(trail.path);
    }
    revisit = (trail.path & (1<<(trail.ptr-1))) != 0;
    terminate = (trail.path==0) | overflow; // force terminate if overflow
}
```

When the trail overflows (>58 tree levels used in the illustrated embodiment), the condition can be detected and the traversal loop is exited by setting the terminate flag.

As can be seen from the foregoing pseudocode, a software implementation of the BIT_TRAIL instruction may be relatively expensive, whereas a hardware implementation of the required operations is straightforward. To illustrate this, the following hardware-friendly version of the BIT_TRAIL instruction shows how the operation can be split into two exemplary 32b instructions BIT_TRAIL.LOW and BIT_TRAIL.HIGH (executed in this order).

```
// BIT_TRAIL, a hardware-friendly view
(t_trail trail, bool revisit, bool terminate) = BIT_TRAIL.LOW/HIGH
(t_trail trail, bool restart, bool intersect0, bool intersect1, bool simplified)
{
  // must call LOW before HIGH
  bool overflow = false;
  if (intersect0 && intersect1)
  {
    if (LOW)
    {
      trail.ptr--;
      if(ptr<0)
      {
        ptr = 0;
        overflow = true;
      }
    }
  }
  else if (intersect0 || intersect1)
  {
    if (!simplified)
    {
      if (LOW)
      {
        trail.ptr--;
        if (ptr<0)
        {
          ptr = 0;
          overflow = true;
        }
      }
      if (trail.ptr < 32)
        trail.path[31:00] |= (1<<trail.ptr);
      else
        trail.path[57:32] |= (1<<(trail.ptr-32));
    }
  }
  else
  {
    if (LOW)
    {
      if (trail.ptr < 32)
      {
        trail.path[31:00] &= -(1<<trail.ptr);
        if (bits from ptr to 31 == ~0)
        {
          revisit = true;                    // carry
          trail.path[31:00] = 0;
        }
        else
        {
          revisit = false;                   // carry
          trail.path[31:00] += (1<<trail.ptr);
        }
      }
      else
        trail.path[31:00] = 0;
    }
    if (HIGH)
    {
      if (trail.ptr < 32)
      {
        if (revisit)
          trail.path[57:32] += 1; // add carry
        else
        {
          trail.path{57:32] &= -(1<<(trail.ptr-32));
          trail.path[57:32] += (1<<(trail.ptr-32));
        }
      }
    }
  }
  // find lowest one
  if (restart)
    trail.ptr = 57;
  else
  {
    if (trail.path[31:00] == 0)
      trail.ptr = 32 + FindLowestOne(trail.path[57:32]);
    else
      trail.ptr = FindLowestOne(trail.path[31:00]);
  }
}
if (LOW)
{
  terminate = overflow; // NOTE: this notifies that trail overflowed.
  return(trail[31:00]);
}
if (HIGH)
{
  if (trail.ptr < 33)
    revisit = (trail.path[31:00] & (1<<(trail.ptr-1))) != 0;
  if (trail.ptr >= 33)
    revisit = (trail.path[57:32] & (1<<(trail.ptr-33))) != 0;
  terminate = (trail.path[57:32]==0) && (trail.path[31:0]==0) |
    | terminate;
  return(trail[63:32]);
}
}
```

This implementation conveys a carry signal in the revisit flag between the two invocations. All arithmetic operations (increment, shifting) are 32 bits wide, and only one 32b register needs to be written per invocation.

Figure 4:
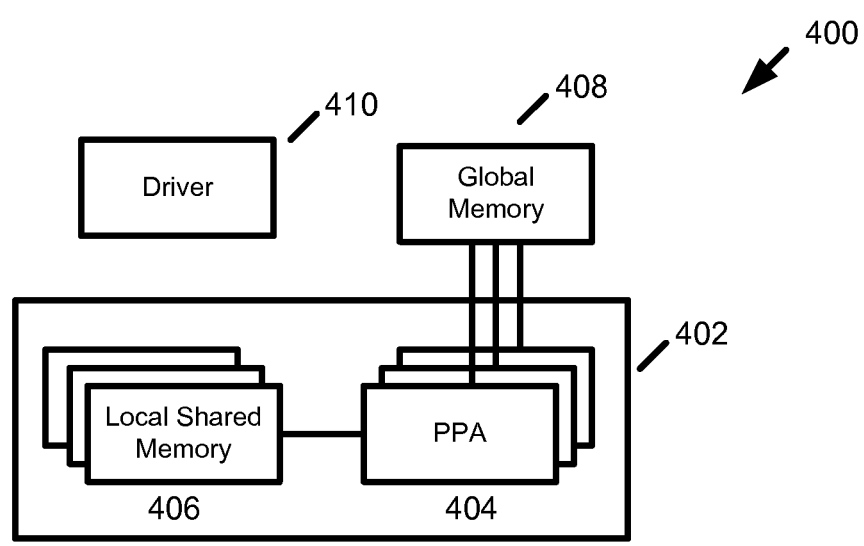
FIG. 4 illustrates a system operable to perform the methods of FIGS. 1-3.

FIG. 4 illustrates an exemplary system 400 operable to perform the operations illustrated in FIGS. 1 and 2 in accordance with the present invention. System 400 includes a processor 402, which includes a plurality of parallel processing architectures 404, each configured to operate on a predetermined number of threads. Accordingly, each parallel processing architecture 404 may operate in parallel, while the corresponding threads may also operate in parallel. In a particular embodiment, the parallel processing architecture 404 is a single instruction multiple data (SIMD) architecture of a predefined SIMD width, for example 4, 8, 16, 27, 32, 64, 128, 256 or more threads.

The processor 402 may further include local shared memory 406, which may be physically or logically allocated to a corresponding parallel processing architecture 204. The system 400 may additionally include a global memory 408 which is accessible to each of the parallel processing architectures 404.

The system 400 may further include one or more drivers 410 for controlling the operation of the processor 402 in accordance with the methods of FIGS. 1 and 2. The driver(s) 410 may include one or more libraries for facilitating control of the processor 402. In one embodiment, the system 400 is included within in a graphics card. In another embodiment, the system 400 is included within the motherboard of an imaging system, e.g., a digital camera. The system 400 may be implemented in other components, for example, a computer or a game console, or in an embedded system, such as in a cellular telephone or internet device.

The processor circuitry of the processor 402 is operable to perform (e.g., execute instructions to carry out) any of the operations illustrated in FIGS. 1 and 2 herein. In an embodiment exemplified by FIG. 1, circuitry of processor 402 (herein "processor circuitry") is operable to traverse a portion of a spatial hierarchy representing a scene which is to be rendered, and to store a number representing the number of nodes traversed in each of the plurality of levels of the spatial hierarchical structure. The processor 402 is operable to represent the number of traversed nodes as (e.g., store the number in the format of) one or more bits in a multi-bit binary sequence. In an embodiment exemplified by FIG. 2, the processor 402 includes processor circuitry to perform the aforementioned functions, as well as processor circuitry for interrupting the traversal of the spatial hierarchy. The processor 402 further includes processor circuitry operable to determine the binary value of the multi-bit binary sequence, and based thereon, identify a node of the spatial hierarchy which is to be visited next upon restart of the spatial hierarchy traversal. The processor 402 further includes processor circuitry operable to resume the traversal of the spatial hierarchy at the node determined to be the next visited node.

As readily appreciated by those skilled in the art, the described processes and operations may be implemented in hardware, software (a computer program element), firmware or a combination of these implementations as appropriate. In addition, some or all of the described processes and operations may be implemented as computer readable instruction code resident on a computer readable medium or product, the instruction code operable to control a computer of other such programmable device to carry out the intended functions. The computer readable medium on which the instruction code resides may take various forms, for example, a removable disk, volatile or non-volatile memory, etc.

The terms "a" or "an" are used to refer to one, or more than one feature described thereby. Furthermore, the term "coupled" or "connected" refers to features which are in communication with each other, either directly, or via one or more intervening structures or substances. The sequence of operations and actions referred to in method flowcharts are exemplary, and the operations and actions may be conducted in a different sequence, as well as two or more of the operations and actions conducted concurrently. The described features are not limited only to their implementation in the exemplary embodiment described therefor, and the skilled person will appreciate that these features can be implemented in the other described embodiments of the invention as well. Reference indices (if any) included in the claims serve to refer to one exemplary embodiment of a claimed feature, and the claimed feature is not limited to the particular embodiment referred to by the reference indicia. The scope of the claimed feature shall be that defined by the claim wording as if the reference indicia were absent therefrom. All publications, patents, and other documents referred to herein are incorporated by reference in their entirety. To the extent of any inconsistent usage between any such incorporated document and this document, usage in this document shall control.

The foregoing exemplary embodiments of the invention have been described in sufficient detail to enable one skilled in the art to practice the invention, and it is to be understood that the embodiments may be combined. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined solely by the claims appended hereto.

What is claimed is:

1. A method comprising:
    traversing a plurality of nodes within a spatial hierarchy, the spatial hierarchy representing a scene which is to be rendered and the spatial hierarchy including at least two hierarchy levels, each of the hierarchy levels of the spatial hierarchy including at least one node;
    for each of the hierarchy levels of the spatial hierarchy, storing a number representing the number of nodes traversed in the hierarchy level, wherein each of the numbers is represented by at least one bit in a multi-bit binary sequence, and wherein the multi-bit binary sequence consists of the bits representing the numbers, and the numbers are concatenated; and
    identifying, based upon the multi-bit binary sequence, a node of the spatial hierarchy which is to be visited next upon restart of the spatial hierarchy traversal.

2. The method of claim 1, wherein each of the number comprises one bit for indicating the number of nodes traversed in the hierarchy level.

3. The method of claim 1, wherein each of the numbers comprises a plurality of bits for indicating the number of nodes traversed in the hierarchy level.

4. The method of claim 1, wherein the multi-bit binary sequence comprises at least one bit for each parent node of the spatial hierarchy.

5. The method of claim 4, wherein storing comprises:
    storing a first number for a hierarchy level; and
    updating the first number to a second number after a traversal of a node included within said hierarchy level.

6. The method of claim 5, wherein updating comprises a binary addition operation.

7. The method of claim 6, wherein the binary addition operation includes adding a binary value of a previously traversed node to a binary value of the traversed node included within said hierarchy level for updating the first number to the second number.

8. The method of claim 1, wherein the multi-bit binary sequence is characterized by a binary value, the method further comprising:
    interrupting the traversal of the spatial hierarchy;
    the identifying is based upon the binary value of the multi-bit binary sequence after the interrupting; and
    resuming the traversal of the spatial hierarchy at the node determined to be the next visited node.

9. The method of claim 8, wherein the traversal of the spatial hierarchy is interrupted in response to a determination that the spatial hierarchy includes more nodes than a stack utilized for traversing the plurality of nodes can accommodate.

10. The method of claim 8, wherein the node of the spatial hierarchy which is to be visited next upon restart of the spatial hierarchy traversal is identified utilizing a pre-computed look-up table that maps from the multi-bit binary sequence to the nodes within the spatial hierarchy.

11. A processor comprising:
    processor circuitry operable to perform a traversal of a plurality of nodes within a spatial hierarchy, the spatial hierarchy representing a scene which is to be rendered and the spatial hierarchy including at least two hierarchy levels, each of the hierarchy levels of the spatial hierarchy including at least one node;
    processor circuitry operable to, for each of the hierarchy levels of the spatial hierarchy, store a number representing the number of nodes traversed in the hierarchy level, wherein each of the numbers is represented by at least one bit in a multi-bit binary sequence, and wherein the multi-bit binary sequence consists of the bits representing the numbers, and the numbers are concatenated; and processor circuitry operable to identify, based upon the multi-bit binary sequence, a node of the spatial hierarchy which is to be visited next upon restart of the spatial hierarchy traversal.

12. The processor of claim 11, wherein each of the numbers comprises one bit for indicating the number of nodes traversed in the hierarchy level.

13. The processor of claim 11, wherein each of the numbers comprises a plurality of bits for indicating the number of nodes traversed in the hierarchy level.

14. The processor of claim 11, wherein the multi-bit binary sequence comprises at least one bit for each parent node of the spatial hierarchy.

15. The processor of claim 14, wherein the processor circuitry operable to store further comprises processor circuitry operable to:
store a first number for a hierarchy level; and
update the first number to a second number after a traversal of a node included within said hierarchy level.

16. The processor of claim 15, wherein the processor circuitry operable to update is operable to perform a binary addition operation.

17. The processor of claim 11, wherein the multi-bit binary sequence is characterized by a binary value, the processor further comprising:
processor circuitry operable to interrupt the traversal of the spatial hierarchy;
the processor circuitry operable to identify comprising circuitry to identify based upon the binary value of the multi-bit binary sequence after the traversal of the spatial hierarchy has been interrupted; and
processor circuitry operable to resume the traversal of the spatial hierarchy at the node determined to be the next visited node.

18. A computer program product, resident on a non-transitory computer readable medium, the computer readable product comprising:
instruction code to traverse a plurality of nodes within a spatial hierarchy, the spatial hierarchy representing a scene which is to be rendered and the spatial hierarchy including at least two hierarchy levels, each of the hierarchy levels of the spatial hierarchy including at least one node;
instruction code to store, for each of the hierarchy levels of the spatial hierarchy, a number representing the number of nodes traversed in the hierarchy level, wherein each of the numbers is represented by at least one bit in a multi-bit binary sequence, and wherein the multi-bit binary sequence consists of the bits representing the numbers, and the numbers are concatenated; and
instruction code to identify, based upon the multi-bit binary sequence, a node of the spatial hierarchy which is to be visited next upon restart of the spatial hierarchy traversal.

19. The computer program product of claim 18, wherein each of the numbers comprises one bit for indicating the number of nodes traversed in the hierarchy level.

20. The computer program product of claim 18, wherein each of the numbers comprises a plurality of bits for indicating the number of nodes traversed in the hierarchy level.

21. The computer program product of claim 18, wherein the multi-bit binary sequence comprises at least one bit for each parent node of the spatial hierarchy.

22. The computer program product of claim 21, wherein the instruction code to store comprises:
instruction code to store a first number for a hierarchy level; and
instruction code to update the first number to a second number after a traversal of a node included within said hierarchy level.

23. The computer program product of claim 22, wherein the instruction code to update comprises instruction code to perform a binary addition operation.

24. The computer program product of claim 18, wherein the multi-bit binary sequence is characterized by a binary value, the method further comprising:
instruction code to interrupt the traversal of the spatial hierarchy;
the instruction code to identify comprising instruction code to identify based upon the binary value of the multi-bit binary sequence after the traversal of the spatial hierarchy has been interrupted; and
instruction code to resume the traversal of the spatial hierarchy at the node determined to be the next visited node.

* * * * *